C. H. JONES.
ROAD LEVELING MACHINE.
APPLICATION FILED JAN. 13, 1914.

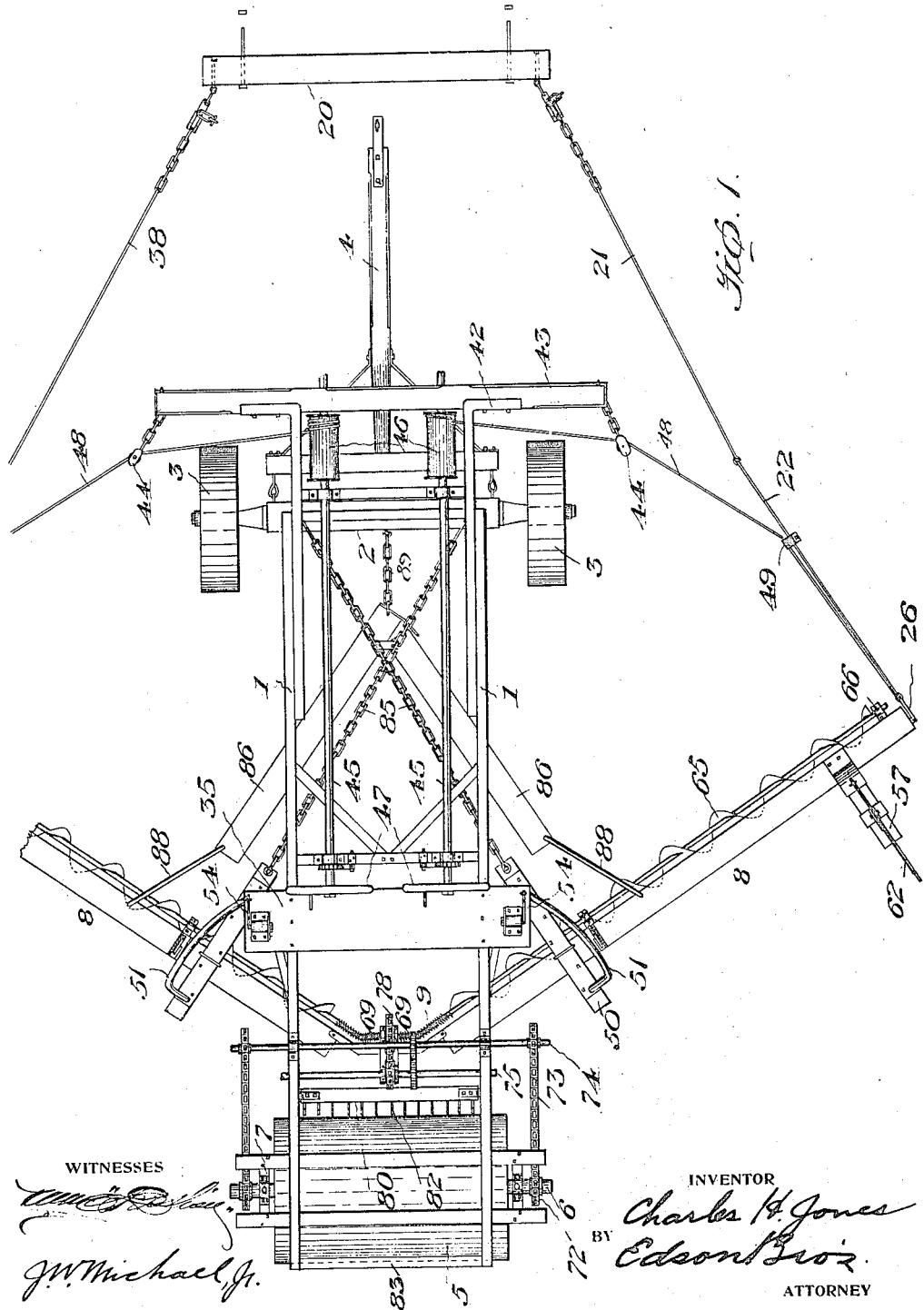

1,140,985.

Patented May 25, 1915.
6 SHEETS—SHEET 2.

WITNESSES

INVENTOR
Charles H. Jones
BY Edson Bros.
ATTORNEY

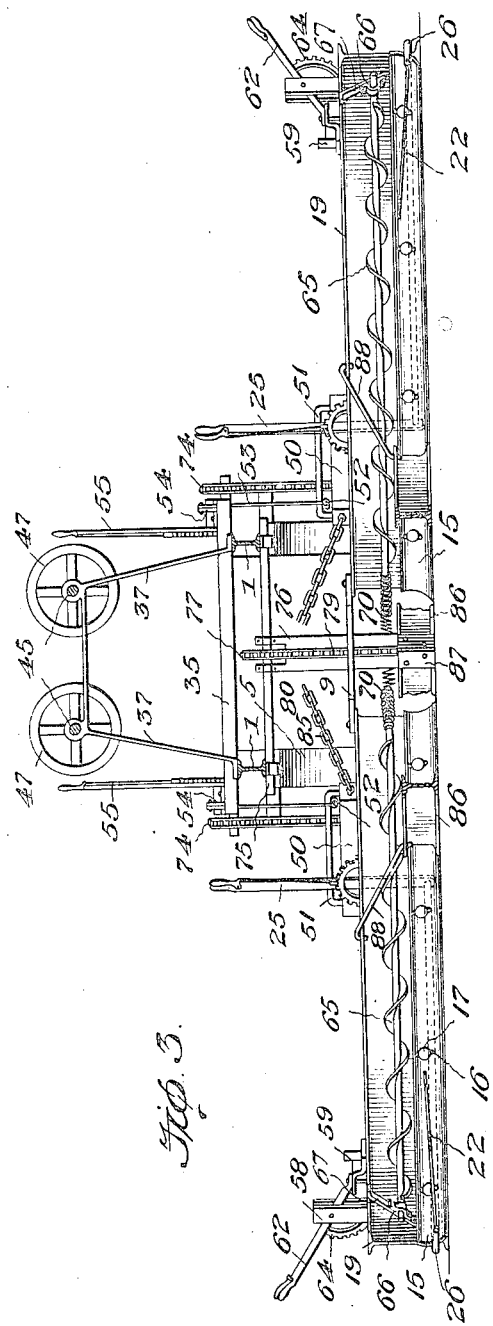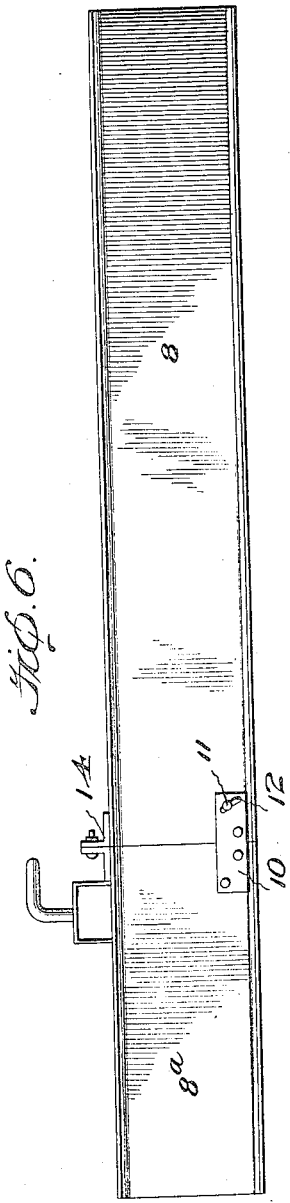

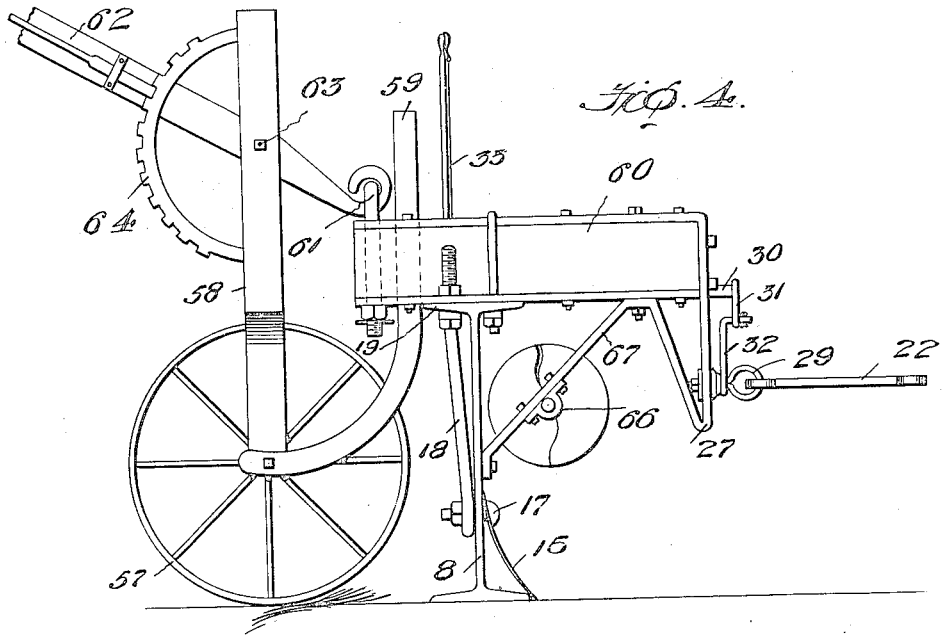
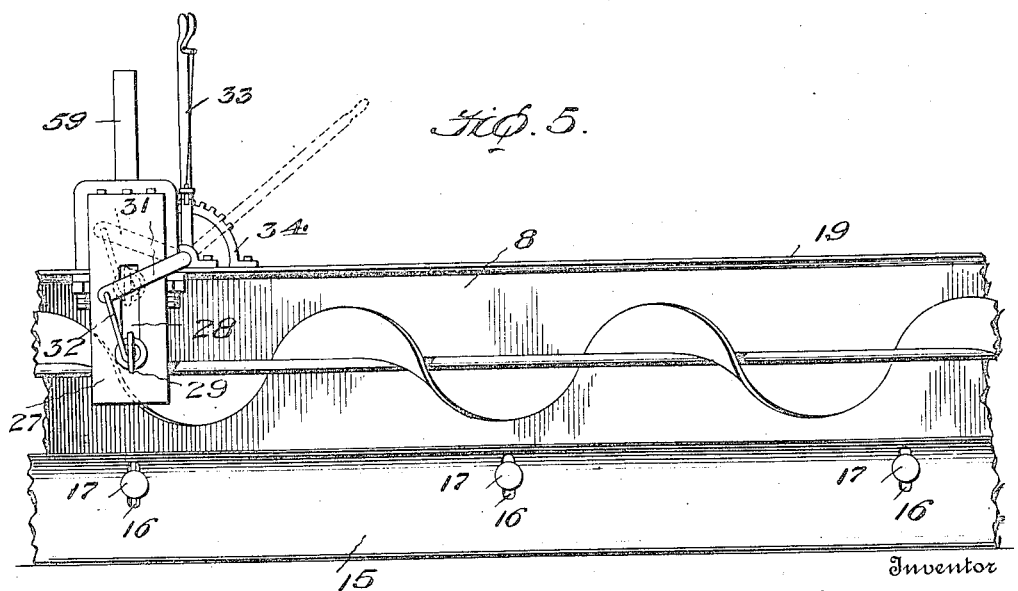

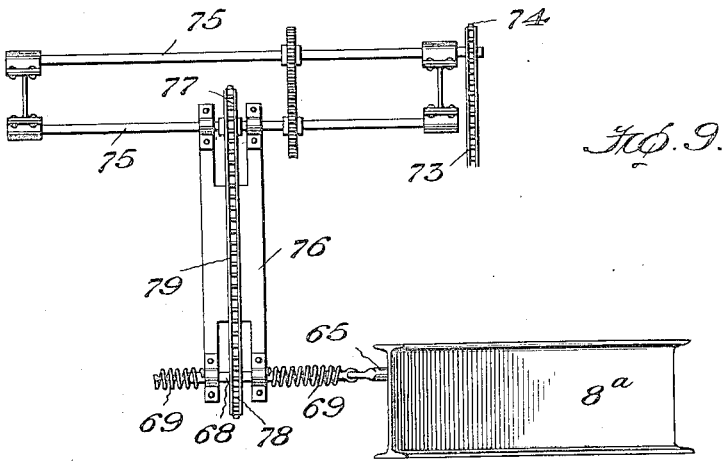
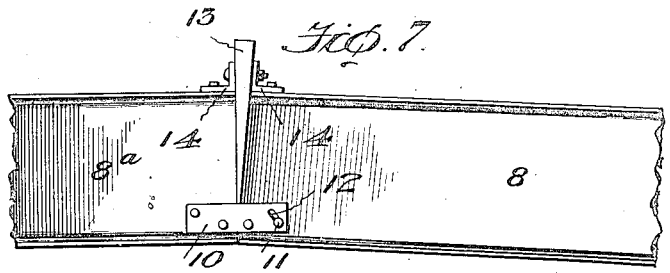
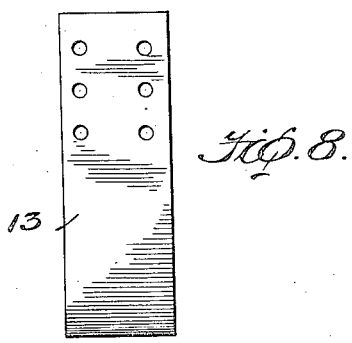
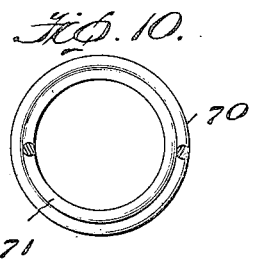

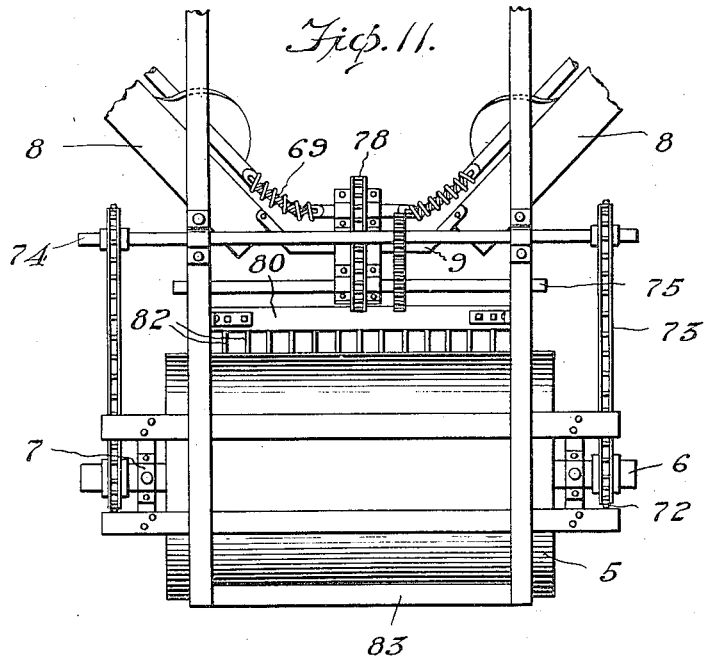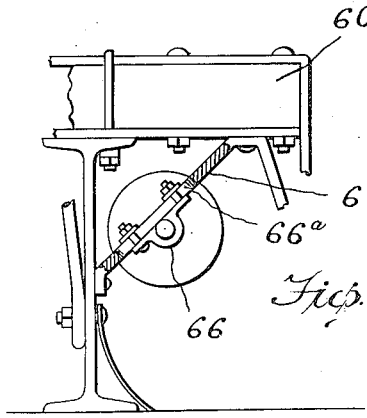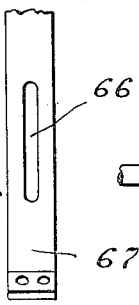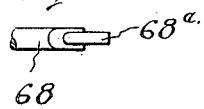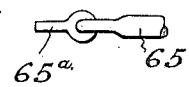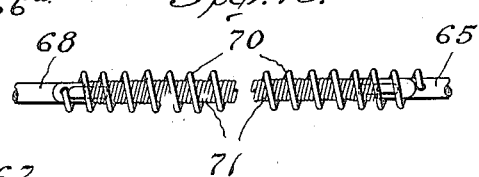

UNITED STATES PATENT OFFICE.

CHARLES H. JONES, OF GALVA, ILLINOIS.

ROAD-LEVELING MACHINE.

1,140,985.  Specification of Letters Patent.  Patented May 25, 1915.

Application filed January 13, 1914. Serial No. 811,882.

*To all whom it may concern:*

Be it known that I, CHARLES H. JONES, a citizen of the United States, residing at Galva, in the county of Henry and State of Illinois, have invented certain new and useful Improvements in Road-Leveling Machines; and I do hereby declare the following to be a full, clear, and exact description of the invention, such as will enable others skilled in the art to which it appertains to make and use the same.

This invention is a road leveling machine having for its object to provide mechanism in a single machine, which will plane or cut away parts of an irregular surface and so distribute the material of the road, or the like, that a graded surface or roadway is produced by drawing the machine over the surface to be treated. The adjustability of the parts of the device make it applicable to grading and leveling surfaces other than roadways.

A further purpose of the invention is to provide means whereby the machine may be readily transported, the parts being contracted for passage through narrow passageways, such as over bridges, without dismantling or disconnecting any of its parts.

The invention is characterized also by, first, the adjustability of the road cutters or scrapers and means so positioned thereon that they remain in a sharpened condition; second, the provision of dirt conveyers carried by the scraper beams whereby the loose earth cut away from the surface may be conducted to a desired point on the road surface and there distributed and packed down as a part of the surface to grade the road, the conveyers being positioned at a suitable point above the contacting surface of the scraper beams with the ground to permit of the loose material to fill in the hollow places on the surface which is being operated upon; third, the provision of a plurality of cutter beams, each in sections, whereby the pitch of the beams may be changed to regulate the grade of a road, the ends of the cutter beams or scrapers being connected to a tractive power, such as a traction engine, or team of draft animals, thereby preventing deviation of the cutters or scrapers from a line parallel with the direction taken by the tractor; fourth, the operation of the conveying means by power taken from the dirt compressing device mounted on the machine; fifth, the provision of a yielding power shaft to convey power to the conveyers, and sixth, an auxiliary scraper adapted to be positioned in advance of the beam scrapers, all of which parts of the machine are under the control of a single attendant.

The invention consists in the combination of mechanism and details of construction which will be fully explained hereinafter, and particularly pointed out in the appended claims.

One embodiment of the invention is illustrated in the accompanying drawings, in which, Figure 1 is a plan view of the machine. Fig. 2 is a side elevation. Fig. 3 is a sectional view through the frame shown in Fig. 1, looking toward the rear of the device. Fig. 4 is an enlarged detail view of an end of a scraper beam. Fig. 5 is a detail view of a draft device which is positioned at the end of the scraper beams, the device being adjustable vertically. Fig. 6 is an enlarged detail view of the two sections of a scraper beam. Fig. 7 is a similar view of the sections placed at an angle to each other, with a separating wedge in position. Fig. 8 is a front elevation of one of the wedges. Fig. 9 is an enlarged detail view of the power transmission from the power shaft of a drive shaft, illustrating the flexible connection between the shaft and the conveyers. Fig. 10 is a detail view of the springs of the drive shaft. Fig. 11 is an enlarged detail view of the rear portion of the machine, showing more clearly the roller. Fig. 12 is an enlarged detail view, partly in section, of a conveyer bracket. Figs. 13 and 14 illustrate means of providing flexible joints for the conveyer shaft and drive shaft. Fig. 15 is an enlarged detail view, in side elevation, of the flexible connection in the form of reversely positioned springs. Fig. 16 is a detail view in plan of the adjusting plate carried by the conveyer bracket.

In the embodiment of the invention disclosed in the drawings, there is provided a frame comprising longitudinal beams, shown as I-beams 1. To the front of these beams is suitably mounted the truck 2 carrying the wheels 3 for transporting the frame. A suitable draft device such as the tongue 4 is connected to the truck, which in turn may be connected with the tractor or team of animals for transporting the machine over the surface. At the rear of the frame 1 is mounted a roller 5, the roller being secured to a shaft 6 journaled in brackets 7 secured to the end face of the beams 1, whereby the roller will support the frame 1 in lieu of the rear truck.

Mounted under the frame 1, and between the truck 2 and roller 5, are a plurality of scraper beams shown in two sections 8 and 8ª, the section 8 being of greater length than the section 8ª. These beams are preferably angularly disposed and mounted on opposite sides of the frame. The inner ends of the beams are preferably spaced apart, and are connected by an angular plate 9, the plate being pivotally connected to the end of each beam section 8ª to permit of pivotal movement of the beams with relation to the frame. The main portion of the plate 9 is shown in Figs. 1 and 3 as positioned substantially parallel with the roller 5, while the arms thereof are shown inclined with relation to the main portion and directed toward the inner ends of the beams 8ª to a position in front of the roller 5.

Each beam 8 is secured to its shorter section 8ª by a suitable tie plate 10, adapted to be bolted to one section, such as 8ª, and to have pivotal connection with the other section such as 8, through the bolt 11. This plate 10, is provided with an arcuate slot 12 to permit of movement of a bolt in the beam 8, when said beam is pivoted upon the bolt 11. This pivotal connection of the beam 8 with relation to the beam 8ª permits of the inclination of the beam 8 from the plane of the beam 8ª, and regulates the grading of a road bed. The beams are maintained at the desired angle with relation to each other, by a suitable wedge 13 which is adapted to be placed between the abutting ends of the beams 8 and 8ª, and to be bolted through suitable apertures in said wedge 13, to the angle irons 14 secured to the top edges of said scraper beams 8—8ª. By this construction, the wedge plate 13 may be placed at various positions with relation to the beams, and lock said beams in a predetermined angular position with relation to each other.

The beams 8—8ª, are preferably in the form of I-beams, as illustrated in Fig. 4, the lower horizontal face of the beam being arranged to engage the surface beneath it. To the front face of these I-beams, is preferably secured a cutter blade 15, which is adapted to be adjustably mounted on the I-beam whereby the edge of said blade may be fed downwardly past the projecting horizontal flange of the I-beam. This adjustment is preferably effected by providing the slots 16 in the cutter blade with which cooperate the bolts 17. It is preferable to make the cutter blades 15 slightly concave in cross section, and to construct them of suitable material, such as steel, with the outer or front face of harder metal than the rear face. Any wearing down or grinding of this blade by its contact with the material or road surface, or worn away portion of soft metal, will operate to retain a sharpened edge due to the harder metal on one face. As the cutting edge wears, the blades 15 may be readjusted with relation to the scraper beams. These bolts serve as heads also to engage the vertically disposed bolts 18 which have their screw threaded ends pass through the upper flange 19 of the I-beam, to which suitable adjusting nuts may be secured to raise or lower the cutter blade from the upper end of the I-beam when desired. It will be understood that the cutter blade 15 may be adjusted by either of these devices, and that the slot 16 may be omitted from the blade, and that the I-beam may be slotted instead, to permit of such adjustment. The outer ends of each of the scraper I-beams 8 are connected with a suitable beam 20, which may be positioned on the tractor. One means of connecting these scraper beams is shown by the link rods 21—22, the former of which is shown provided with flexible connection to the beam 20. The rod 22 is shown in Figs. 1 and 2 connected in a suitable manner to an end of the scraper beam, which rod is pivotally mounted at 24 near the base of the beam. In Fig. 2, a lever 25 is illustrated to elevate the plane or draft of the beam, whereby, when the lever is moved to a position from the vertical, the crank arm 26 will be raised upwardly to elevate the draft rod 22.

In Figs. 4 and 5 there is illustrated another embodiment of the draft feature, wherein a bracket plate 27 is mounted on the I-beam in any suitable manner, said plate being slotted as at 28 to permit of the vertical movement of a coupling 29 in said slot. Journaled near this plate 27 is a shaft 30 having a crank arm 31, which is connected to the coupling 29 by a link 32. This shaft 30 is adapted to be rotated by a lever 33 having means to engage a sector 34 to retain the lever 33 and shaft 30 in a predetermined position, thereby determining the elevation of the draft rods 22.

The frame 1 is provided with a suitable platform 35, and also with a suitable upper framework comprising the upright standards 36, 37, and the inclined standards 38—39. The inclined standards 38 are secured in any suitable manner, such as by bolting, to the frame 1, and have their upper forward ends bent at an angle to bring the standard to a horizontal plane, and thence at right angles to form a support 42 for a suitable beam 43. This beam is provided at its outer ends with pulleys 44, for a purpose to be referred to hereinafter. A plurality of shafts 45 arranged parallel to each other, are mounted on the upper framework, one end of the shaft being journaled into the beam 43, while the other end of the shaft is journaled on the upright standard 37. Each shaft is provided with a drum 46 near the forward end thereof and adjacent the beam 43, while at its opposite end there is provided suitable means such as a wheel 47 for rotating the shaft, said wheel being conveniently positioned with relation to the platform. Suitable flexible connection, such as a chain or rope 48, is employed between the outer ends of the I-beams 8 and the drums 46, said connection being passed through the pulley 44 and through a guide block 49 carried by the rod 22. This guide block 49 serves to maintain the flexible connection 48 at a suitable point in advance of the I-beams, which will prevent any conflict with the line of draft through the connections 21—22. The shafts 45 may be rotated to coil the flexible connection 48 on the drums 46 to change the radial position of the beams with relation to the frame, said beams being contracted toward the truck by means of their pivotal connection at their inner ends with the plate 9. This feature will be found of advantage in drawing the machine over narrow roads, or over bridges. It will be also observed that the device is capable of independently operating either of said scraper beams 8, thereby grading one side of a road only, or a narrow road. Near the end of the shorter I-beam 8ª, adjacent a point where it is coupled to the beam 8, there is shown positioned, a transverse supporting beam 50, which may be suitably connected to the scraper I-beam. To the upper side of this supporting beam 50, is mounted an arcuate staple 51, having an angular arm at one end thereof. A suitable anti-friction device such as a roller 52, is adapted to ride on the under face of this staple 51, said roller being connected by flexible means 53 to a crank arm 54, on a shaft adapted to be operated by a lever 55, the lever being provided with a sector 56 to maintain the parts in the desired position. This lever operates to raise or lower the scraper section 8ª with relation to the surface to be treated, and the flexible connection 53 together with its roller 52, also permits of a swinging of this section of the scraper beams 8ª with relation to the frame.

Near the outer end of the longer scraper beam 8, there may be provided suitable means to elevate the beam from the surface when transporting the device over a road which is not to be treated. Referring particularly to Fig. 4, this elevating and conveying mechanism is shown as comprising a caster wheel 57 mounted on an axle carried by the upright frame 58. The wheel 57 and frame 58 are provided also with a forked arm 59, the vertical straight end of which is adapted to pass through suitable means, such as a beam 60, or its equivalent, secured to the top face of the I-beam 8, the arm 59 being vertically movable within the beam 60 through an aperture provided therein. An eye-bolt 61 may be provided on the beam 60, to be engaged by an end of a lever 62 adapted to be fulcrumed at 63 on the upright member 58, said lever 62 having a suitable plunger rod to engage the teeth of the sector 64, whereby the lever may be moved to a desired position to throw all the weight of the I-beam 8 upon the caster wheel through its member 58, said wheel being freely movable within the aperture of beam 60 to follow the direction of movement of the machine over the surface. By this arrangement the beam 8 may be employed to exert its full weight against the surface to be treated, or the caster wheel 57 may bear some of the weight of the beam, a feature which will be readily understood by those skilled in the art, when treating roads of different materials.

Suitable conveying devices are mounted on the scraper beams 8—8ª, and in the drawings I have illustrated these conveyers as screws 65, the screws being mounted on suitable brackets 66 carried by the beam 8, although the screws extend beyond said beam 8 and across the surface of the beam 8ª. These brackets 66 are preferably adjustably mounted on an inclined surface 67 of the support 27 carried by the beam 60, whereby the screws may be placed at different elevations with relation to the I-beam. By mounting the screws solely on one of the beams 8 or 8ª, the other beam is permitted to be moved to an angle to treat the surface of a road, as previously described.

By reference to Fig. 9, it will be observed that the ends of the screws 65 are connected to a drive shaft 68 by suitable flexible connection, such as the springs 69. It is preferred to use the springs as a connection between the shafts 68 and the screws 65 because of the change in the angle which is frequently made between the I-beams 8—8ª and the frame. These springs 69 are preferably composed of an outer open wound larger spring, and an inner concentric closely wound spring. The open wound outer spring 70 is employed as a drive spring, while the inner spring 71 is employed to support the outer spring in its operative position. The springs adjust themselves to the positions of the scrapers and screws, and for that reason are preferred to gears. This drive shaft is preferably positioned parallel with the plate 9 connecting the beams 8ª, and in the space left between the ends of said beams.

Power is transmitted to the drive shaft 68, as follows: A sprocket wheel 72 is mounted on the end of the shaft 6, carried by the roller, to transmit power through the medium of a sprocket chain 73 to a sprocket shaft 74 mounted transversely of the frame members 1. The shaft 74 is geared to an intermediate shaft 75 in any suitable manner, which latter shaft 75, is mounted on a plane below that of the shaft 74, and preferably in the rear thereof. On this shaft 75 is mounted a swinging plate 76, which is bifurcated at each end thereof to receive an upper sprocket wheel 77 and a lower sprocket wheel 78, said sprocket wheels being connected by the chain 79. The drive shaft 68 is journaled in the lower end of said plate 76, and the reversely positioned springs 71 are mounted on each side of said plate 76. The movability of the plate 76 on shaft 75, permits of the various adjustments of the I-beams 8—8ª, without disarranging the power connection with the roller. At a suitable place between the opening formed by the ends of the I-beams 8ª and the roller 5, is mounted a spreader 80, which is mounted for slight movement at the rear of the frame 1, said spreader 80 being connected to the beams 8ª by suitable resilient connection 81. The lower end of the spreader may be provided with a series of resilient fingers 82, said fingers operating to distribute the material passing through the space left between the ends of the beams 8ª, and also to break up the large clods of dirt prior to engagement by the roller 5. If desired, the roller 5 may be provided with a suitable scraper 83 adapted to engage the surface thereof and to be maintained in contact with the surface of the roller 5 by a spring 84 mounted on the frame 1.

The I-beams 8ª are preferably connected to the truck 2 by suitable chains indicated at 85. In the drawings one of said chains is shown connected with the supporting beam 50 and an opposite side of the truck, while the other of said beams is connected in like manner to the truck, the chains crossing each other at a point substantially forwardly of the frame and underneath the same. This feature of coupling the scraper beams with the front truck is preferable, especially when the direction of movement of the apparatus is changed, as in rounding a curve, at which time the scraper on the right side of the machine will be permitted to make a wide sweep, while that on the left side of the machine can be restricted in its movements, should the curve in the roadway be made toward the left.

At a suitable point between the truck and the scraper beams 8—8ª, and under the frame, is positioned an auxiliary scraper shown as comprising a plurality of scraper beams 86, preferably of the same form as the beams 8—8ª, although said beams 86 may be of less height and weight, if desired. The beams 86 are preferably connected at one end by a plate 87, which I have termed a wear plate, said plate being bolted to both of said beams. The other ends of the beams 86 are diverged to form a substantially triangular scraper or plow, the free ends of which beams 86 are preferably connected to the scraper beams 8 by a link 88, while the forward end or apex of the auxiliary scraper is preferably connected to the central portion of the truck 3 by flexible connection 89. This connection, as stated, is preferably in the central line of draft, although it may be otherwise connected if found desirable. The auxiliary scraper serves to preliminarily grade the central portion of the road and to deflect the material cut away toward the conveyers or screws 65, where it is again conveyed toward the central portion of the machine to be distributed by the spreader and packed down by the roller 5.

In operation, the beams 8—8ª are set at proper angles with relation to the frame 1, to cover the width of a road to be graded, and the scraper beam 8 is set at the proper angle with relation to the scraper beam 8ª for the surface grade of the road. The forward movement of the machine will cause power to be transmitted from the shaft 6 through the shafts 75, 68, and the flexible connection to the reversely operating screws 65, whereby the loose earth is fed from the front of the scrapers 8—8ª to the space left between the inner ends of the scrapers 8ª, where the spreader 80 operates to break up the large particles of loose earth and distribute the same in front of the roller 5, which compacts the earth in the center of the roadway. The auxiliary scraper 86 serves to level the roadway in advance of the main scraper 8, and to deflect the material so cut away, into engagement with the plane like blade on the scrapers and to be conveyed by the screws 65. In turning curves in a roadway, the flexible connections 85 with the beams 8 and truck 2, will permit one beam to describe a wider arc than the one on the opposite side, according to the direction in which the turn is made. The draft rods 22 being adjustable with relation to the height of the tractor, by means of the lever 25, or the lever 34, which may be employed in lieu of the lever 25, insures the proper cutting angle of the scraper beams 8 with relation to the frame of the machine.

Having thus described the invention, what I claim as new and desire to secure by Letters Patent is:

1. In a device of the class described, a frame, a sectional beam angularly disposed with relation to said frame, one section of said beam being adjustable vertically with relation to its other section, and a retaining wedge adapted to be secured between the connected ends of the beam sections to maintain said adjustable sections at the desired angle.

2. In a device of the class described, a frame, a sectional scraper beam angularly disposed with relation to the side of the frame, one section being adjustable vertically with relation to the other section, a wedge to maintain the adjustable section in a predetermined position, means to connect the free end of the adjustable beam with a tractor, and means at the free ends of said adjustable beam to regulate the line of draft from the tractor to the beam.

3. In a road machine, a frame having, a scraper beam adapted to be positioned angularly with relation to the side of the frame, said scraper beam having an adjustable section to engage the road surface on a plane lower than the inner section of the scraper beam, means to connect the free ends of said scraper beam to a tractor, a lever carried by each adjustable section of the scraper beam, and a draft device vertically adjustable by movement of said lever to change the line of draft from the tractor to the scraper beam.

4. In a road machine, a frame, a truck positioned at one end of the frame, a roller positioned at the opposite end of the frame, a plurality of scraper beams carried by said frame, flexible connections between said scraper beams and said truck, an auxiliary scraper connected to the truck and positioned beneath the frame for independent movement with relation to the frame, and means yielding to connect the auxiliary scraper with said scraper beams.

5. In a road machine, a frame, a sectional scraper beam carried thereby, means carried by said frame for elevating the inner section of said scraper beam, means positioned on the outer section of the scraper beam for elevating said section from contact with the surface to be treated, and means adapted to be positioned between the ends of said beam sections to retain one beam section at a predetermined position with relation to the other section.

6. In a road machine, a plurality of scraper beams each having a plurality of adjustable sections, a plurality of brackets, one secured to each section of each scraper beam, journal bearings adjustably mounted on said brackets, conveyer screws carried by each scraper beam and mounted in said journal bearings to conform to the adjustment of the sections of the scraper beam, and means to connect the screws for simultaneous movement.

7. In a road machine, a frame, a plurality of angularly disposed sectional scraper beams so mounted on the frame as to leave a space between them beneath said frame, one section of said scraper beam being adjustable with relation to the other section, a power shaft mounted on the frame in a space between the ends of said scraper beams, conveyer screws carried by the adjustable sections of said scraper beams, and means to connect said power shaft with each of said conveyer screws.

8. In a road machine, a frame, a plurality of angularly disposed sectional beams so mounted on opposite sides of the frame as to leave a space between them beneath the frame, a yieldable drive shaft carried by said frame substantially in alinement with the space between the ends of said scraper beams, one section of each scraper beam being adjustable with relation to the other section, conveyer screws mounted on the adjustable section of the scraper beam, and a flexible connection between the drive shaft and each conveyer screw.

9. In a road machine, a frame, a plurality of sectional beams angularly disposed on opposite sides of the frame, conveyer screws carried by each of said scraper beams, a yieldable hanger plate carried by said frame, a drive shaft carried by said hanger plate, and flexible connections between the drive shaft and said conveyer screws.

10. In a road machine, a frame, a plurality of scraper beams carried thereby, a yieldable hanger plate suspended from the frame, a driving shaft carried thereby, a plurality of conveyer screws carried by said beams, and flexible connection between said driving shaft and said conveyer screws, said flexible connection comprising a helical spring.

11. In a road machine, a frame, a scraper beam carried thereby, a screw mounted on said scraper beam, a yieldable drive shaft suspended from said frame, and a flexible connection between the drive shaft and the conveyer screw comprising an inner helical spring and an outer helical spring.

12. In a road machine, a frame, a plurality of scraper beams carried by said frame, conveyer screws carried by each of said scraper beams, a yieldable drive shaft positioned between said scraper beams, and concentric inner and outer helical springs connecting said drive shaft with each of said conveyer screws.

13. In a road machine, a frame, a plurality of scraper beams carried thereby, conveyer screws coöperating with said scraper beams, a drive shaft carried by said frame, and a flexible connection between the drive shaft and said conveyer screws, said flexible connection comprising an open wound outside helical spring, and a concentric close wound inside helical spring.

14. In a road machine, a frame, a plurality of scrapers carried thereby, a power shaft carried by said frame, a drive shaft yieldably mounted on said frame, means to connect the power shaft with the drive shaft, a plurality of conveyer screws, and flexible connection between the drive shaft and the conveyer screws.

15. In a road machine, a frame, a plurality of scrapers, a plurality of conveyer screws, a roller carried by said frame, a shaft carried by said roller, a power shaft mounted on the frame, a yieldable drive shaft suspended from said frame, means to transmit power from the roller shaft to the power shaft, means to transmit power from the power shaft to the drive shaft, means to support said conveyer screws of the scraper beams on a plane above the surface to be operated upon, and flexible means to connect said conveyer screws with the drive shaft.

16. In a road machine, a scraper beam having a horizontally flanged base, a knife blade extending the full length of said scraper beam and adjustable on said beam, said knife blade being composed of hardened material on one surface and softer material on another surface thereof, whereby the wear upon the blade will serve to retain it in a sharpened condition.

17. In a road machine, a scraper beam comprising a plurality of sections adapted to be connected end to end near the bottom thereof, to permit the sections to be moved apart at the top thereof, a plurality of retaining angle irons secured to the top of each beam, and an adjustable wedge adapted to be positioned into engagement with the ends of each of said beams, and to be secured to the angle irons.

18. In a road machine, a frame, a plurality of angularly disposed beams so mounted on opposite sides of the frame as to leave a space between them, an angular auxiliary scraper positioned under the frame so that it operates upon a surface greater than the space left between said beams, a plurality of conveyers carried by said frame, a spreader in coöperative relation to said conveyers and adapted to operate upon material passing through the space between said scraper beams, said spreader being provided with a plurality of resilient fingers, and resilient means connecting the spreader with the scraper beams.

19. In a road machine, a frame, a forward pivoted track, a plurality of angularly disposed scraper beams mounted on opposite sides of the frame, a draft beam secured transversely to each of said scraper beams, flexible connections extending from each of said draft beams to an opposite side of the truck, said connections crossing each other at a point beneath the frame, and means to maintain said scraper beams at the desired angle with relation to the frame.

20. In a road machine, a frame, a truck, a plurality of angularly disposed scraper beams so mounted on opposite sides of the frame as to leave a space between them, flexible connection between the truck and each of said beams, an auxiliary scraper positioned beneath said frame and having diverging arms overlapping the space between the inner ends of said scraper beams, flexible connection between the auxiliary scraper and the truck and pivotal connection between the auxiliary scraper and said scraper beams.

21. In a road machine, a frame, a scraper beam adjustable with relation to said frame, said scraper beam being constructed in sections, one section being adjustable with relation to the other section, means connecting the scraper beam with a tractor, and means positioned near the end of the adjustable scraper beam to change the line of draft from the tractor to the scraper beam, said adjustable means comprising a crank shaft mounted on the scraper beam, a bearing plate adjacent the crank shaft, a draft device vertically movable in said bearing plate, and a lever for moving the device to the desired angle with relation to the bearing plate.

22. In a road machine, a frame, a scraper beam pivotally mounted thereon, a draft beam positioned transversely on said scraper beam, an elongated staple mounted on the draft beam and positioned transversely of the scraper beam, and means on the frame to slidably engage said staple.

23. In a road machine, a frame, a platform, an angularly adjustable scraper beam mounted on said frame, a draft beam on said scraper beam, an arcuate staple secured to the draft beam and elevating means carried by said platform and having slidable connection with said arcuate staple.

In testimony whereof, I affix my signature, in presence of two witnesses.

CHARLES H. JONES.

Witnesses:
  DALE N. WEST,
  E. L. GOENIN.